Feb. 15, 1938.  H. L. MUELLER  2,108,501

COASTER BRAKE

Filed Oct. 23, 1936

INVENTOR.

Homer L. Mueller

BY Fay, Oberlin & Fay

ATTORNEYS.

Patented Feb. 15, 1938

2,108,501

UNITED STATES PATENT OFFICE 2,108,501

COASTER BRAKE

Homer L. Mueller, Cleveland, Ohio, assignor to The Cleveland Welding Company, Cleveland, Ohio, a corporation of Ohio Application October 23, 1936, Serial No. 107,224

6 Claims. (Cl. 192—6)

This invention relates as indicated to coaster brakes for vehicles such as bicycles and more particularly to an improved coaster brake characterized by the provision of improved braking means in such construction.

More specifically this invention relates to the provision of a coaster brake for bicycles provided with an hydraulic brake.

It is a principal object of my invention to provide a device of the character described characterized by simplicity of construction which insures positive operation of the apparatus to an improved degree and over long periods of usage.

Other objects of my invention will appear as the description proceeds.

To the accomplishment of the foregoing and related ends, said invention, then consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Figure 1:
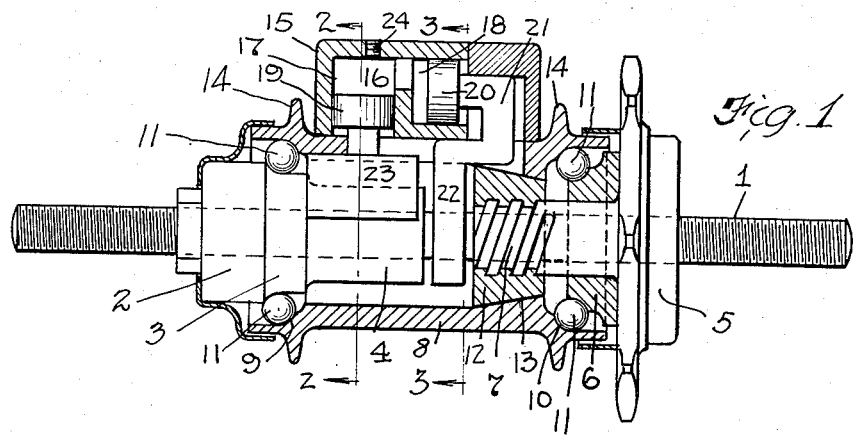
Figure 2:
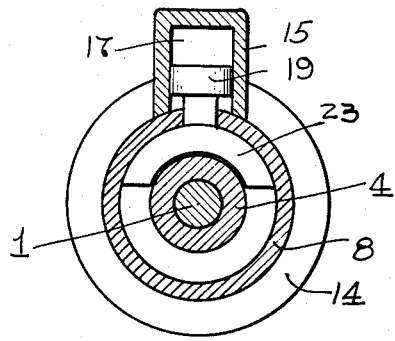
Figure 3:
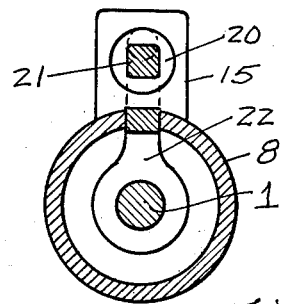
Figure 4:
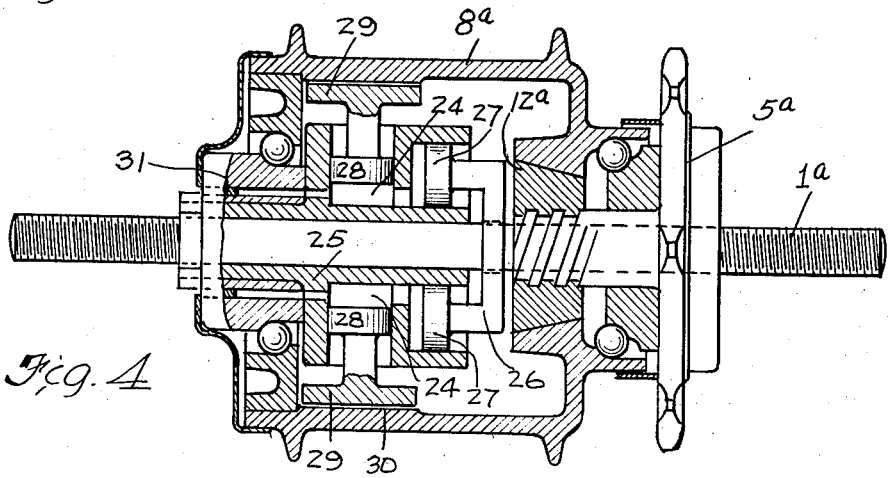

Fig. 1 is a transverse sectional view of one form of brake constructed in accordance with the principles of my invention; Fig. 2 is a transverse sectional view of the structure shown in Fig. 1 taken on a plane substantially indicated by the line 2—2; Fig. 3 is a transverse sectional view of the structure shown in Fig. 1 taken on a plane substantially indicated by the line 3—3; and Fig. 4 is a sectional view of another form of brake constructed in accordance with my invention.

Referring now more specifically to the drawing and more especially to Fig. 1, the apparatus herein illustrated consists generally of an axle shaft 1 designed to be secured by means of conventional nuts between the rear forks of a bicycle frame (not shown). Secured to the axle shaft 1 is an axle member 2 provided with a ball race 3 and an inwardly directed braking extension 4.

Rotatably mounted on the axle shaft 1 is a conventional driving sprocket 5 provided with a ball race 6 and an externally threaded collar 7 extending towards the center of the assembly.

Mounted coaxially on the axle shaft 1 is a hub barrel 8 provided with ball races 9 and 10 which cooperate with the ball races 3 and 6 respectively of the axle units in rotatably supporting the barrel on anti-friction ball bearings generally indicated at 11.

Threadably engaged on the threaded collar 7 is a nut 12 so formed that when the sprocket 5 is rotated in a driving direction, the nut will be drawn into engagement with the tapered face 13 on the inner periphery of the hub barrel 8 locking therewith so that further rotation of the driving sprocket 5 will transmit driving rotation to the hub barrel 8. The hub barrel 8 is, of course, provided with peripheral flanges 14 which serve as anchoring means for the inner ends of the spokes of the wheel.

Mounted on one side of the hub barrel 8 is a casing generally indicated at 15 which is so secured to the hub barrel as to provide a closed chamber 16 therein, which chamber is normally filled with a fluid such as is usually employed in hydraulic brakes.

The chamber 16 is divided into two cylindrical portions 17 and 18 respectively within which are mounted pistons 19 and 20. The piston 20 has an arm 21 secured thereto, which arm extends inwardly over and around the axle shaft 1 and rotatable with respect thereto. The inner end 22 of the piston arm 21 is arranged adjacent the inner end of the nut 12 so that when the sprocket 5 is rotated in a direction opposite to the normal driving direction thereof, the arm 22 is moved to the left causing the piston 20 to move to the left in the cylinder 18.

The piston 19 has a brake shoe 23 secured to the lower end of its associated arm, which shoe, as most clearly illustrated in Fig. 2, is adapted to engage a substantial portion of the outer peripheral surface of the braking extension 4 of the axle member 2.

The casing 15 may have a filler plug 24 associated therewith and through the opening normally closed by such plug the chamber 16 may be initially filled with brake fluid or the quantity of such fluid replenished during use as the occasion may require.

The operation of the above described form of construction will be readily understood by having reference to Fig. 1. During driving rotation of the sprocket 5, the nut 12 will be drawn to the right into locking engagement with the inclined face 13 on the inner periphery of the hub barrel 8 so that such hub and the sprocket 5 rotate at the same speed. During coasting, the sprocket 5 will be held stationary with the nut 12 slightly to the left from the position illustrated in Fig. 1, i. e., out of engagement with the inclined face 13 on the hub 8. The hub 8 is, therefore, free to rotate in either direction relatively to the sprocket 5.

If it is desired to apply the brake shoe 23 to the stationary braking axle member 4, the sprocket 5 will be rotated in a direction opposite to that in which it is rotated for driving. This results in a movement of the nut 12 to the left as viewed in Fig. 1 and the nut engaging the extension 22 of the piston arm 21 causes the piston 20 to move to the left in the cylinder 18. The fluid displaced by such movement of the piston 20 causes the piston 19 to move radially inwardly, thus moving the attached brake shoe 23 into braking engagement with the member 4.

While throughout the foregoing description and in the drawing only one pair of pistons, i. e., one brake shoe, has been shown and described, it is nevertheless within the contemplation of my invention to duplicate the parts shown above the horizontal axis in Fig. 1 below such axis so as to produce a balanced construction, if the same should be desired.

The construction illustrated in Fig. 4 is different from that shown in Fig. 1 in that the braking surface in Fig. 4 is on the hub member and the pistons applying the braking forces fixed with respect to the axle member.

In Fig. 4, the axle member 1a, the sprocket 5a, the nut 12a, are all substantially identical with the corresponding parts shown in Fig. 1, so that similar reference characters have been employed to designate these parts. The hub member 8a in the construction shown in Fig. 4 is slightly larger than the corresponding part of the construction shown in Fig. 1, this being occasioned by the change in the arrangement of the braking devices.

A pair of fluid filled chambers 24 are provided in a housing generally indicated at 25 which is fixed with respect to the axle shaft 1a. A yoke member 26 centrally encircling the axle shaft 1a terminally carries pistons 27 and is mounted in closely spaced relation to the inner face of the nut 12a. The pistons 28 likewise mounted in the chambers 24 carry brake shoes 29 arranged to engage an annular braking surface 30 on the inner periphery of the hub 8a.

The construction illustrated in Fig. 4 is briefly as follows:—When the sprocket 5a is rotated in a direction counter to the direction of rotation during driving, the nut 12a moves to the left in engagement with the yoke member 26, causing the pistons 27 to move to the left displacing fluid in the chamber 24 and causing the pistons 28 to move radially outwardly.

The pistons 28 move outwardly until the brake shoes 29 engage the braking surface 30 and thereafter continued rotation of the sprocket 5a in the direction last-named will result in an increase in the braking force applied to the surface 30.

The fluid filling the chambers 24 may be introduced thereto through the passage, the outer end of which is normally closed by the plug 31 and thus, if, during use, it should become necessary to replenish such fuel, the desired amount of the same may be introduced by simply removing the plug 31.

From the above description, it will be noted that I have provided a novel braking device for bicycles and the like characterized by its simplicity of construction and the fact that the braking force is applied in a more efficient and more effective manner than any types of construction previously available.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as invention:

1. In a bicycle coaster brake, the combination of relatively rotatable hub and axle members, a fluid-filled chamber fixed with respect to one of said members, pistons extending into said chamber, a brake shoe on one of said pistons and arranged to engage one of said relatively rotatable members, a driving sprocket, and means actuated by said sprocket for actuating the other of said pistons.

2. In a bicycle coaster brake, the combination of relatively rotatable hub and axle members, a fluid-filled chamber fixed with respect to said hub member, pistons extending into said chamber, a brake shoe on one of said pistons and arranged to engage said axle, and means for actuating the other of said pistons.

3. In a bicycle coaster brake, the combination of relatively rotatable hub and axle members, a fluid-filled chamber fixed with respect to one of said members, pistons extending into said chamber, a brake shoe on one of said pistons and arranged to engage one of said relatively rotatable members, a driving sprocket, and means functionally responsive to relative movement between said axle member and said driving sprocket counter to driving rotation of said sprocket for actuating the other of said pistons.

4. In a bicycle coaster brake, the combination of relatively rotatable hub and axle members, a driving sprocket provided with a threaded collar, a nut on said collar, a fluid-filled chamber within said hub, a plunger extending into said chamber and arranged for actuation by said nut, a second plunger extending into said chamber, and a brake shoe on said second plunger and arranged to engage one of said relatively movable members.

5. In a bicycle coaster brake, the combination of relatively rotatable hub and axle members, a driving sprocket provided with a threaded collar, a nut on said collar, a fluid-filled chamber within said hub and fixed with respect thereto, a plunger extending into said chamber and arranged for actuation by said nut, a second plunger extending into said chamber, and a brake shoe on said second plunger and arranged to engage said axle member.

6. In a bicycle coaster brake, the combination of relatively rotatable hub and axle members, a driving sprocket provided with a threaded collar, a nut on said collar, a fluid-filled chamber within said hub and fixed with respect to said axle member, a plunger extending into said chamber and arranged for actuation by said nut, a second plunger extending into said chamber, and a brake shoe on said second plunger and arranged to engage said hub member.

HOMER L. MUELLER.